(12) United States Patent
Yankielun et al.

(10) Patent No.: US 6,608,489 B2
(45) Date of Patent: Aug. 19, 2003

(54) DEVICE, AND METHOD OF ITS USE, FOR CONCURRENT REAL TIME ALERTING TO ACCUMULATION OF MATERIAL UPON MULTIPLE AREAS OF A SURFACE

(75) Inventors: Norbert E. Yankielun, Lebanon, NH (US); Charles C. Ryerson, Hanover, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 16 days.

(21) Appl. No.: 10/015,784

(22) Filed: Dec. 17, 2001

(65) Prior Publication Data

US 2003/0112020 A1 Jun. 19, 2003

(51) Int. Cl.$^7$ .......................... G01R 27/32; G01R 31/11
(52) U.S. Cl. .......................... 324/642; 324/533; 324/534
(58) Field of Search ................................. 324/642, 643, 324/644, 645, 646, 533, 534; 244/134; 73/599

(56) References Cited

U.S. PATENT DOCUMENTS

| | | | | |
|---|---|---|---|---|
| 5,467,944 A | * | 11/1995 | Luukkala | 244/134 F |
| 5,629,485 A | | 5/1997 | Rose et al. | 73/599 |
| 5,695,155 A | | 12/1997 | MacDonald et al. | 244/134 F |
| 5,772,153 A | | 6/1998 | Abaunza et al. | 244/134 F |
| 5,900,820 A | * | 5/1999 | Yankielun | 340/580 |
| 6,121,894 A | * | 9/2000 | Yankielun et al. | 340/870.31 |
| 6,281,688 B1 | | 8/2001 | Yankielun | 324/643 |

OTHER PUBLICATIONS

Fawwaz T. Ulaby, Microwave Remote Sensing Active and Passive, vol. III, pp. 2043–2044.

Peter S. Ray, Broadband Complex Refractive Indices of Ice and Water, pp. 1836–1843.

J. M. Baker and R. J. Lascano, The Spatial Sensitivity of Time–Domain Reflectometry, Soil Science May 1989, pp. 378–384.

J. H. Knight, Sensitivity of Time Domain Reflectometry Measurement to Lateral Variations in Soil Water Contents Water Resources Research, vol 28, No 9, pp. 2345–2352, Sep. 1992, US.

\* cited by examiner

*Primary Examiner*—N. Le
*Assistant Examiner*—Donald M Lair
(74) *Attorney, Agent, or Firm*—Earl H. Baugher, Jr.

(57) ABSTRACT

A system is provided for detecting accumulation of material concurrently on multiple areas of a surface in real time. In one embodiment, it is used for detecting icing of airframes while in use or on the ground while awaiting use. It may use either Time Domain Reflectometry (TDR) or Frequency Modulated Continuous Wave (FM-CW) sources to provide a known energizing signal to a transmission line sensor. The system ascertains the signal's round trip travel time in the transmission line. As material accumulates around the transmission line sensor, the medium through which the signal propagates is indicated by the change in time for the signal to propagate in relation to propagation in a reference medium, e.g., air. By employing pre-specified spectral analysis algorithms and referencing to the dielectric constant of media of interest, a determination of the occurrence, location, and the rate and type of material accumulation can be made.

2 Claims, 5 Drawing Sheets

DEVICE, AND METHOD OF ITS USE, FOR CONCURRENT REAL TIME ALERTING TO ACCUMULATION OF MATERIAL UPON MULTIPLE AREAS OF A SURFACE

FIELD OF THE INVENTION

The invention relates to electronic detection derived from correlating changes in dielectric field strength. More particularly, it applies to systems that detect the presence of certain classes and combinations of material as the material accumulates on a surface, e.g., ice buildup on the surfaces of aircraft.

BACKGROUND

Ice accretion on the wings of fixed-wing and on the rotors of rotary-wing aircraft can have disastrous results. The ice that forms on a wing structure, especially along the leading edge, modifies the aerodynamics of the wing, resulting in decreased lift. In the extreme, this can lead to loss of lift and control of the aircraft and potentially a crash. Ice accumulating elsewhere on the wing and airframe can add significant weight to the aircraft. Several techniques and flight protocols have been developed and are widely used to prevent a plane from becoming ice covered, both in flight and on the ground.

Some, typically larger aircraft, are equipped with in-flight heaters that melt the ice before it can substantially build up on wings or rotor blades. Protocols have been established for permitting or denying flight under weather conditions or into areas where the potential of aircraft icing is high. On the ground, there are deicing protocols and methods that ensure that there is little to no accretion of ice on wings or rotors immediately prior to flight.

An outstanding problem is that it is difficult while in flight or on the ground to determine when ice is building up on the aircraft until a substantial accretion has taken place. By that time, it may be difficult or even too late to take evasive maneuvers or rely on the in-flight deicing capability.

On the ground, it would be useful to monitor the state of wing and airframe coverage by deicing fluid, liquid water or the accretion of ice. Availability of this information can be used to decide when to implement deicing procedures with greater efficiency and economy.

Current icing detectors using radio frequencies (RF) in transmission lines are single point detectors. For example, U.S. Pat. No. 5,695,155, *Resonator Based Surface Condition Sensor*, issued to; MacDonald et al., Dec. 9, 1997, uses multiple microstrip resonators, one for each point, positioned to couple with an RF energized transmission line. The resonators produce amplitude minima in the RF signal, the resonance changing dependent upon the makeup of the dielectric covering the microstrips. By fabricating each microstrip to have a different resonant frequency and knowing where each is installed, the location of material accretion can be identified.

U.S. Pat. No. 5,772,153, *Aircraft Icing Sensors*, issued to Abaunza et al., Jun. 30, 1998, employs complex phase detection circuitry with a parallel electrode "surface gap transmission line" that must be affixed to various locations of interest on a surface, one for each point. In a preferred embodiment the surface gap transmission line is energized with an electric field of varying frequency that is reflected by a ground (conducting) plane upwards into a volume immediately above and between the two electrodes. It determines the makeup of the material on the surface, if any, by detecting phase changes in the RF signal passing down the two electrodes and reflecting upwards from the ground plane and converting these phase changes to "propagation times" to correlate to changes in the square root of the dielectric constant of the media through which the reflected RF signal passes. Temperature data may also be used to provide an unambiguous determination of the material. One embodiment also uses an identical second sensor system as a reference, eliminating the need to determine temperature.

Other ice detectors use acoustics, heat, light, or a combination thereof, e.g., U.S. Pat. No. 5,467,944, *Detector For Indicating Ice Formation on the Wing of an Aircraft*, issued to Luukkala, Nov. 21, 1995 is based on a thread-like or a tape-like transducer, through which an ultrasonic signal is transmitted at one end. The attenuation of a signal passing through the thread is measured with a receiver at the opposite end while the thread is simultaneously being heated such that ice that may surround it melts again, the attenuation thus resuming its initial level. U.S. Pat. No. 5,629,485, *Contaminant Detection System*, issued to Rose et al., May 13, 1997, transmits ultrasonic signals through a surface "skin" and collects data based on propagation of these signals through the skin and the dispersion curves representing natural resonance of the signals on an "unloaded" surface skin. Knowing a priori the response of an "unloaded" skin and a catalog of responses for one that is loaded with a variety of materials, e.g., water, ice, glycol, and combinations thereof, a detector and warning system may be applied to various applications, e.g., buildup of ice on an airframe.

A preferred embodiment of the present invention provides a continuous indication of the presence or absence of a buildup of material on a surface, e.g., liquid water, glycols or ice alone, or mixed phase liquid water, glycols and ice, over large areas of an airframe. Additionally, it has the potential to indicate the presence of at least a pre-specified minimum level of a contaminant on any region of a surface instrumented with a preferred embodiment of the present invention.

SUMMARY

A system is provided for detecting accumulation of types of material, including combinations of types, upon multiple areas of a surface concurrently. In one preferred embodiment, it uses a single long wire conductor having a pre-specified characteristic impedance. At one end of the conductor an energizing source is connected while at the opposite or distal end the conductor is configured to have a "termination impedance" different from the conductor's characteristic impedance. For this embodiment, an electromagnetically conducting ground plane is employed. The ground plane abuts the conductor but is electromagnetically isolated from it. The ground plane may be part of the surface being instrumented if that surface is a good conductor. A second preferred embodiment does not require an adjoining ground plane, but uses another similar conductor run parallel and in the same plane as the single conductor or the single wire configuration. This is useful when the surface comprises a strong dielectric such as fiberglass.

A major part of the system is the sub-system comprising a reflectometer, either a Time Domain Reflectometer, including commercial models, or an FM-CW reflectometer. One function of the reflectometer is to provide the analog signal that energizes the conductor, typically a transmission line. It also processes the reflection of the analog signal from the distal end as well as partial reflections from any dielectric discontinuities present at boundaries indicative of accumulation of material on the surface above the conductor. The processed reflected signal, combined with a portion of the original signal, yields information for decision making.

A number of configurations can be used for the transmission lines, e.g., conducting tape electromagnetically insulated on one side, striplines, electromagnetically insulated wires, coaxial cable, and substrates having at least a dielectric layer and an electromagnetically conducting layer.

The TDR may be fabricated from components. One example uses a generator for providing a pulse of narrow pulsewidth and appropriate repetition frequency; a circulator for coupling the pulsed signals to the conductor and coupling the reflections from the conductor to the TDR; and a processor for processing the signals and displaying results, such as an oscilloscope.

The FM-CW reflectometer may be constructed from the following components: a linear sweep generator for generating the FM-CW analog signal; a circulator for coupling the FM-CW signal to the conductor and the reflected signals from the conductor to the reflectometer; a mixer for combining the reflected signal with a portion of the initial analog signal; a low pass filter for passing only the low frequency spectra, typically audio, of the mixed signal; a high pass audio filter for passing only the highest frequency spectra of the audio signal; an audio amplifier for amplifying the high frequency audio signal prior to digitizing it; an analog-to-digital converter (ADC) for converting the analog audio signal to digital format; a digital signal processor (DSP) for further processing to extract data on features of the reflected analog signal and a computer for comparing data on features of the reflected analog signal with reference data and displaying results.

Use of either of these embodiments enables alerting to accumulation of material on an instrumented surface as it occurs and concurrently for all instrumented surfaces. In a preferred embodiment of the present invention, a single reflectometer may operate multiple transmission line sensors by multiplexing the analog reflection signals from each transmission line sensor.

The method for detecting accumulation of material on multiple areas of a surface concurrently includes:

emplacing a transmission line on the surface such that it is electromagnetically isolated from the surface;

providing an electromagnetically conducting ground plane adjacent to the transmission line or another similar transmission line placed a pre-specified distance from the first and parallel thereto, both of which are electromagnetically insulated from each other;

energizing the transmission line(s) with an appropriate analog electromagnetic signal, either a pulsed signal or FM-CW, at one end of the transmission line(s);

receiving at the same end as the source of the energizing at least one reflection of the analog electromagnetic signal from the far, or distal, end of the transmission line(s); and extracting at least one quantifiable feature from the reflected signal.

In one embodiment, a value associated with the extracted quantifiable feature may be compared to a reference value to detect a particular material, e.g., ice, or material type, e.g., a glycol or glycol solution, that may be present in a pre-specified amount, i.e., thickness, on the surface immediately above the transmission line sensor.

The pulsed signal used with the TDR may be provided at a peak signal level of between 0.05 V and 10 V, a carrier frequency of between 1 MHz and 40 GHz, a pulse width of between 0.1 nanosec and 10 millisec, and at a pulse repetition frequency (PRF) of between 0.01 Hz and 1 MHz. Typical commercial models operate a 900 MHz half-cosine pulse shape with pulse widths of 2 nanosec at a 5V peak.

Stepped versions may operate within the same carrier frequency range as pulsed versions, but with rise times from 100 picosec to 100 nanosec and an amplitude step from 10 mV to 10 V. A commercial stepped version has a typical rise time of 200 picosec and an amplitude step of 300 mV at a carrier frequency of 900 MHz.

The FM-CW signal may be provided at a signal level of between 1 mW and 10 W, at a carrier frequency of between 1 MHz and 40 GHz, a bandwidth of between 10 and 60% of carrier center frequency and is swept linearly in carrier frequency at a pre-specified period of between 100 millisec to 10 millisec. A preferable embodiment operates at a signal level of 10–100 mW, a carrier center frequency of between 100 MHz and 1 GHz, with a bandwidth of from 30–50% of the carrier center frequency, and is swept linearly at a period up to 10 millisec.

In one embodiment, the processing by the reflectometer provides at least a measure of the round trip time interval for the analog signal to travel from the source end to the distal end of the transmission line and return as at least a partial reflection from the distal end. It may also provide at least a measure of the time for the analog signal to travel from said source end to a first location along the transmission line comprising a dielectric boundary that generates a partial reflection of the signal before it gets to the distal end. This location is defined by the closest boundary to the source end of a first region around the transmission line that incorporates a material other than the medium surrounding the transmission line in a reference state.

Additional information may be obtained by employing a spectrum analysis algorithm to extract said at least one feature, e.g., the type of material, the thickness of the accumulation, or the location(s) of the accumulation. Further, the identification of material type and thickness of accumulation may be facilitated by the provision of a reference, such as a look-up table, associated with the processing electronics. The combined use of algorithms and references may provide information on: thickness of accumulation upon the surface, location of accumulation upon the surface, type of material accumulating upon the surface, mixes of material types accumulating upon the surface, rate of accumulation of material upon the surface, and combinations thereof.

Further, a preferred embodiment of the present invention provides for conveying the information to a decision maker, either an automated alerting system or directly to a human operator, such as an aircrew or ground crew member. Finally, a preferred embodiment of the present invention may permit prediction of the occurrence of an accumulation, given the use of suitable algorithms to manipulate information able to be provided by the transmission line sensors.

Implementation of this system solves the following problems for private, industrial, commercial and municipal aviation users:

detection of liquid water on aircraft wing or rotor;

detection of ice accretion on aircraft wing or rotor;

detection of dry aircraft wing or rotor;

detection of the presence of deicing agent on aircraft wing or rotor;

wet/dry condition of wings and rotors on ground and in flight;

condition of spray-on deicing agent;

integration of time domain reflectometry with structure of aircraft wing or rotor; and integration of FM-CW reflectometry with structure of aircraft wing or rotor.

Advantages of preferred embodiments of the present invention, as compared to conventional systems, include:

concurrent remote electronic indication and measurement of presence of liquid water, ice or deicing agent on multiple aircraft surfaces either in flight or on the ground;

in-air sensing of icing conditions of aircraft surfaces, including wings and rotors;

on-ground sensing of icing conditions of aircraft surfaces, including wings and rotors;

economical installation with low lifecycle cost;

ease of installation and use;

installation without substantial restructuring of surfaces and the vehicle;

resistant to mechanical and environmental stresses of aircraft operation;

provides a quantified estimate of the time required between de-icing events;

increased flexibility for use;

may be used to predict icing events;

allows de-icing materials to be applied in the location and amounts needed, when needed without wholesale application of hazardous materials;

high reliability and low false alarm rate;

alternate configurations available; and ready upgradability to state-of-the-art improvements.

Embodiments of the present invention may be applied to any operation where knowledge of actual or potential material accumulation on a surface is valuable. Use of this apparatus may be applied in manufacturing processes, to detect buildup of unwanted material such as ice or snow on roads, runways, power lines, load-bearing members, roofs, bridges, etc. Numerous industrial, commercial, municipal, and military aviation applications may take advantage of this concept, alone or in concert with other mechanisms such as alarms or heaters, for example.

Preferred embodiments are fully disclosed below, albeit without placing limitations thereon.

DETAILED DESCRIPTION

There are at least two functionally different methods for performing a reflectometry measurement for a preferred embodiment of the present invention: time domain reflectometry (TDR) and frequency modulated continuous wave (FM-CW) reflectometry. Frequency modulated continuous wave (FM-CW) systems have a long history in radar system applications and are well documented in the literature. See, e.g., U.S. Pat. No. 6,281,688, *Transmission Line Reflectometer Using Frequency Modulated Continuous Wave*, issued to Yankielun, Aug. 28, 2001, and incorporated herein by reference. In a preferred embodiment of the present invention, instead of launching electromagnetic waves from an antenna into free space, as would be done in a radar application, this energy is coupled to a sensor that is essentially an RF transmission line that may be affixed to an airframe 200 wing or rotor.

Figure 1:
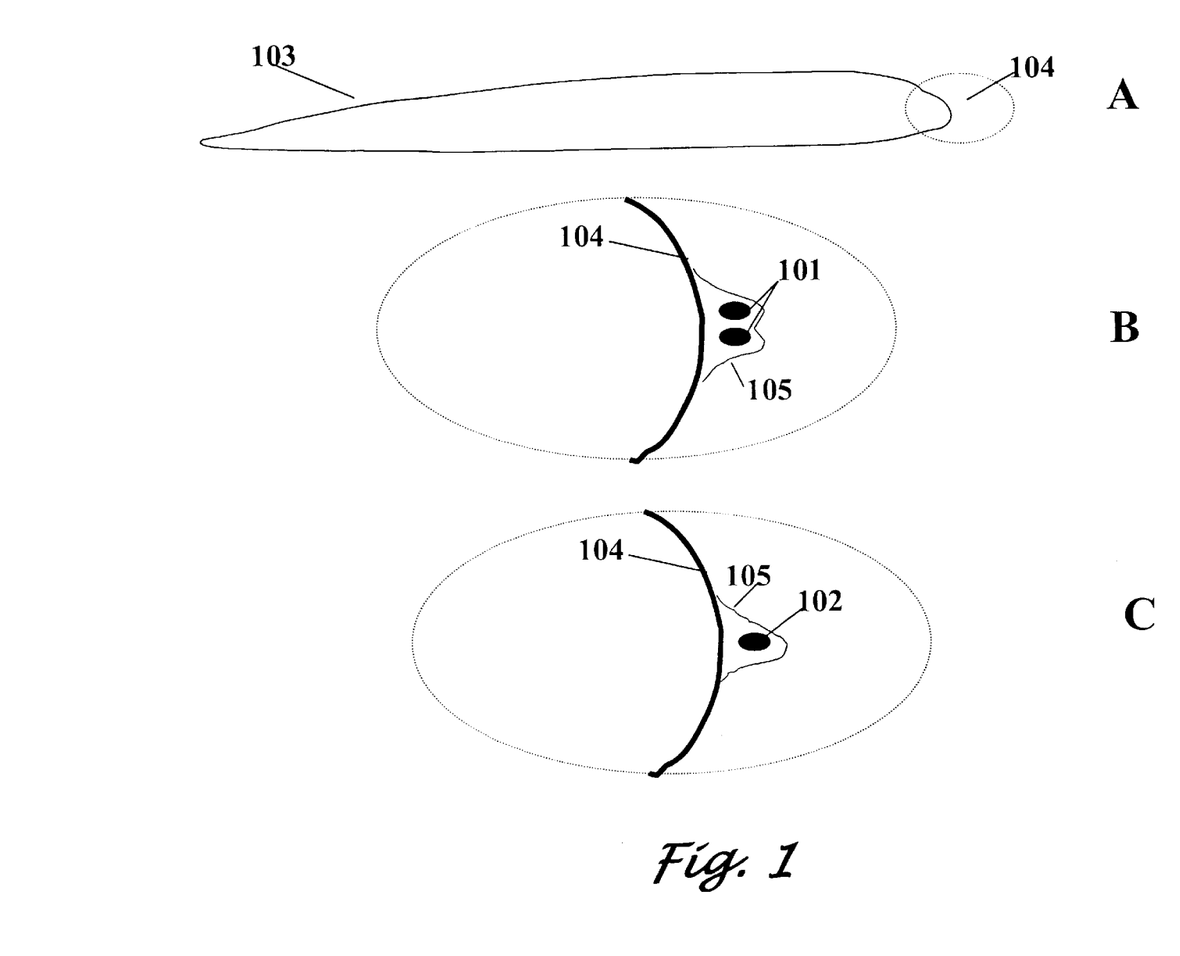
FIG. 1 is a view of implementations of transmission line sensors for a preferred embodiment of the present invention.
Figure 2:
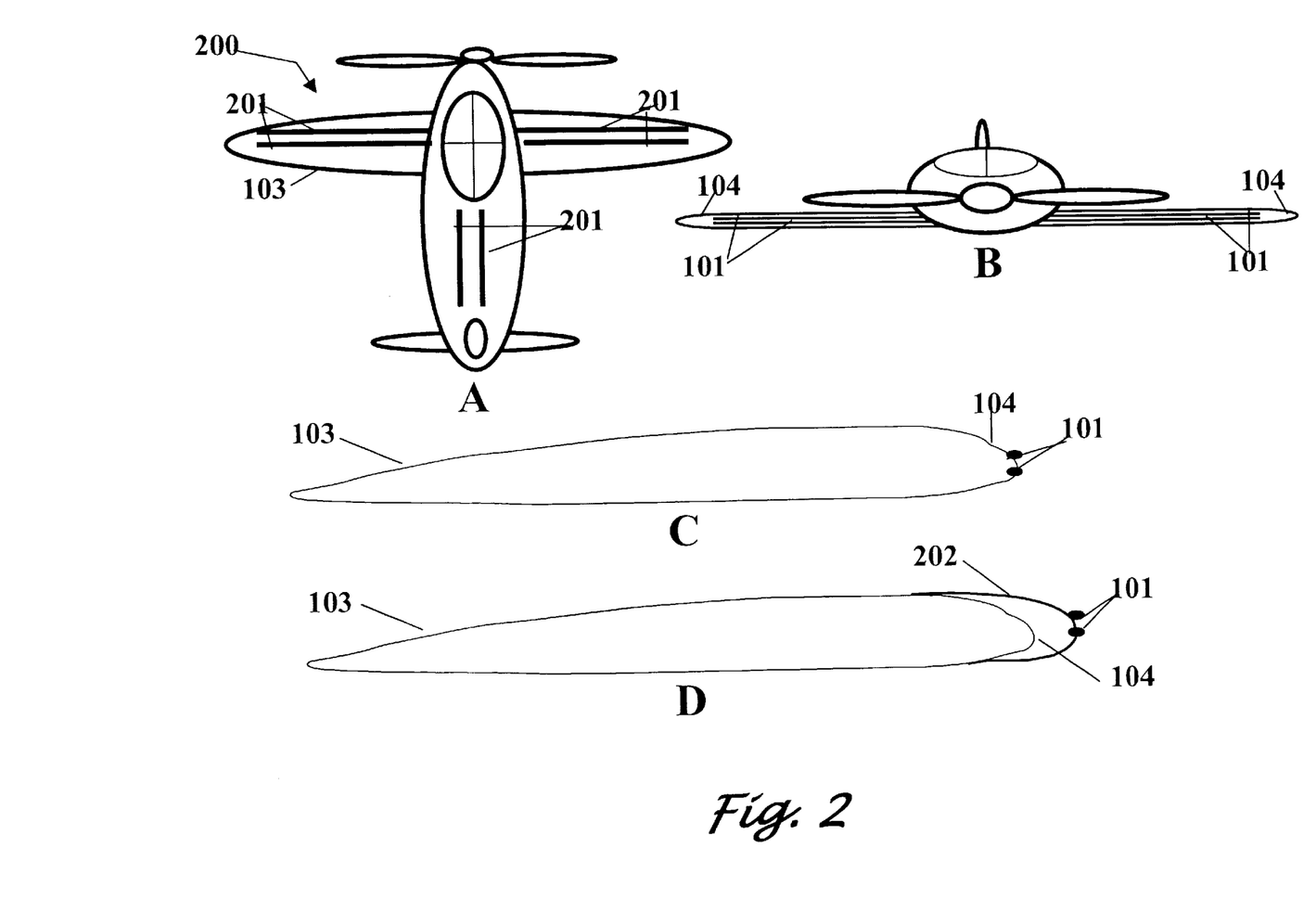
FIG. 2 shows various views of transmission line sensors of a preferred embodiment of the present invention on an airframe.

Refer to FIGS. 1 and 2. FIG. 1 displays a wing section with alternative configurations of a transmission lines used with a preferred embodiment of the present invention. FIG. 2 shows top and end views of an aircraft with transmission lines installed on surfaces in FIG. 2 Part A and FIG. 2 Part B, respectively. An edge view of a fixed wing 103 is shown in FIG. 1 Part A. One embodiment envisions a two-wire parallel transmission line sensor 101 as shown in FIG. 1 Part B and in FIG. 2 Part C. Alternatively, when a surface is suitable to use as a conducting ground plane, such as that of a wing 103 fabricated of aluminum, a single line 102, as shown in FIG. 1 Part C and FIG. 2 Part D, can be used in conjunction with the surface of the ground plane such as the leading edge 104 of an aluminum wing 103 to establish a suitable path for propagation of the signal. Note that the transmission line sensor 101, 102 may be susceptible to severe wear on the leading edge and a suitable protective coating 105, such as a weather-resistant epoxy, may be applied to resist deterioration.

The dielectric constant, $\in$, is an indicator of the resistance to the transmission of electromagnetic energy within a medium such as air, water, or ice. For example, compare the following representative values of $\in$:

| | |
|---|---|
| air | 1.0 |
| fresh water | 88.0 |
| ice | 3.17 |

Thus, it is 88 times more "difficult" to transmit an electromagnetic signal in fresh water than in air. There is a wide range of deicing agents (some of proprietary formulation) with dielectric constants, $\in_d$, that, depending on the solution, are less than that of water alone and significantly greater than that of air or ice alone. A solution of liquid water and glycol has a dielectric constant, $\in_{w+g}$, that will vary depending upon the proportion of the two components in solution, but in all cases the bulk dielectric, $\in_B$, of the mixture will be less than the dielectric of liquid water alone, $\in_w$, and significantly greater than the dielectric of air, $\in_a$, or the dielectric of ice, $\in_i$, alone.

At 0° C., fresh water has an $\in_w$ of 88 and a refractive index, $n_w$, of 9.4 whereas solid, bubble-free, fresh water ice has an $\in_i$ of 3.17 and $n_i$ of 1.78. Ray, P. S., 1972, *Broadband Complex Refractive Indices of Ice and Water, Applied Optics*, 11(8):1836–1843. There is a wide range of deicing agents with both an $\in_d$ and nd less than that of water. The bulk dielectric constant of a mixture of these components is a function of the dielectric constant of the materials and their volume fractions. Ulaby et al., *Microwave Remote Sensing, Active and Passive*, Vol. III, pp. 2043–4, 1986. Here, for example, a first order linear mixing formula is used to relate the volume fractions of ice, $V_i$, and water, $V_w$, and their respective dielectric constants to estimate the bulk dielectric of the mixture, $\in_b$.

$$(V_w + V_i) \in_b = V_w \in_w + V_i \in_i = V_w \in_w + (1 - V_w) \in_i. \tag{1}$$

Figure 3:
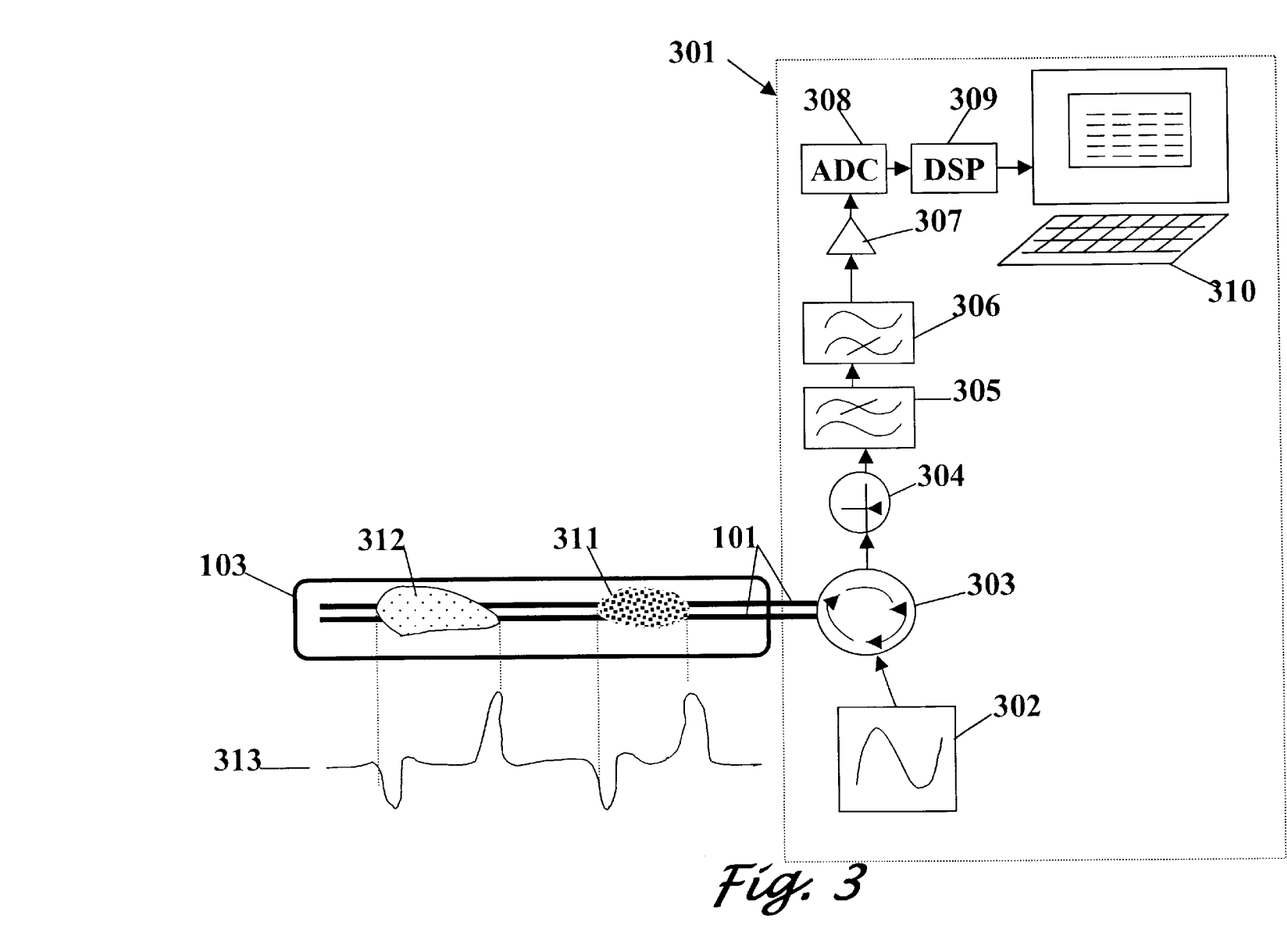
FIG. 3 details a configuration using an FM-CW signal source and related processing electronics for a preferred embodiment of the present invention.

If ice accumulates on and around the transmission line sensor 101, 102, the bulk dielectric constant, $\in_B$, of the volume immediately surrounding the transmission line sensor 101, 102 decreases and the signal's propagation velocity along the transmission line sensor 101, 102 increases. The sensor round trip travel time is inversely proportional to any change in velocity. It is this change in round trip travel time that is measurable by a Time Domain Reflectometer (TDR) the commercial version 401 of which is depicted in FIG. 4B and the component version 303, 402, 403 in FIG. 4A, or an FM-CW reflectometer 301 as depicted in FIG. 3. In a preferred embodiment, this time difference can be used to indicate the absence, presence, or buildup of ice on an airframe 200 member instrumented with one or more transmission line sensors 101, 102, 201 connected to a TDR 401 or FM-CW 301 reflectometer.

Figure 5:
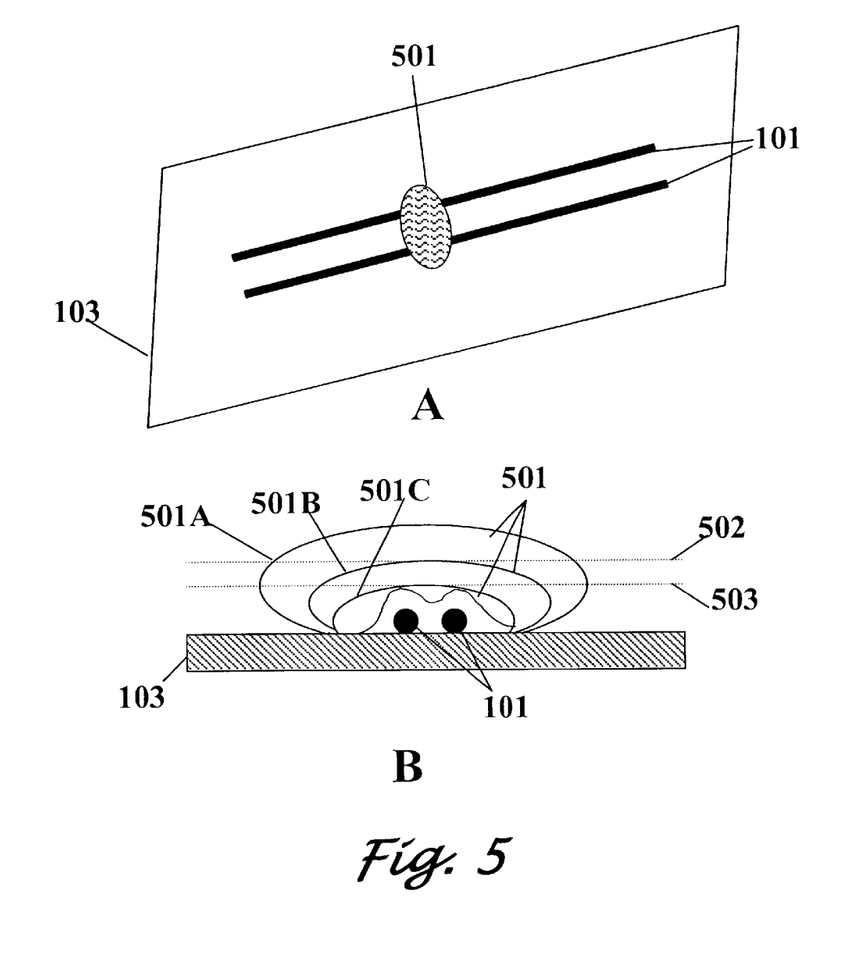
FIG. 5 depicts the shape of the volume about a two-wire transmission line in which electromagnetic energy is present in an amount useful in employing a preferred embodiment of the present invention.

Refer to FIG. 5. Baker and Lascano (1989) describe and map the "region of influence," i.e., that "region" (volume) 501 surrounding a two-wire transmission line 101 in which the signal propagates as shown in the end view of FIG. 5 Part B. Baker, J. M. and Lascano, R. J., 1989, *The Spatial Sensitivity of Time-Domain Reflectometry*, Soil Science, 147(5):378–384. A top view of this volume 501 is represented as an elliptic or a quasi-rectangular area, as shown in FIG. 5 Part A, surrounding the two parallel wires 101 (probes) that would comprise the transmission line sensor 101 of a preferred embodiment of the present invention. The height of the volume (ellipse) 501 is determined by the strength of the signal imposed upon the transmission line sensor 101 at the point of observation. A thin coating 503 of material such as ice will alter the height of the electromagnetic field at that location as shown by the relative position of the middle ellipse 501B. A thick coating 502 will further suppress the electromagnetic field height as show by the innermost ellipse 501C. Of course, the maximum field height will exist at the uppermost ellipse 501A when there is no buildup of material on the surface over the transmission line sensor 101 and the medium is a dielectric such as air. By use of the technique described in Knight (1992), the dimension of the region of sensitivity 501 about the parallel lines can be estimated for a given cumulative radial energy distribution, $P(\rho, \beta)$, bounded by a region of radius, r, surrounding the parallel transmission line. Knight, J. H., 1992, *Sensitivity of Time Domain Reflectometry Measurements to Lateral Variations in Soil Water Content*, Water Resources Research, 28, (9):23–52.

$$P(\rho, \beta) = 1 - \frac{\ln\left[\frac{(\rho^2 + 1 - \beta^2)}{(\rho^2 - 1 + \beta^2)}\right]}{2\ln\left[\beta^{-1} + \sqrt{\beta^{-2} - 1}\right]}, \rho \geq (1 + \beta) \tag{2}$$

where:

$$\rho = \frac{r}{d}$$

$$\beta = \frac{b}{d}$$

b=radius of the transmission line conductors
d=one-half of the center-to-center distance between the conductors
r=radius of the region of sensitivity around the conductor pair A dielectric constant changes as a "step function" at the boundary between media. Each change in the value of the dielectric constant within a non-homogeneous volume representing a transmission path of energy may be discovered by monitoring for any change in the round trip travel time of a signal traversing that volume. In addition to affecting the travel time of the energy, a portion of the energy is immediately reflected back to its source at each "boundary" between differing media as discussed below.

Refer to FIG. 3 and FIG. 5. Thus, at a boundary, such as air/water, air/ice, or water/ice, examples of which are shown in FIG. 3 at the dotted lines at 311, within a volume 501 along and surrounding a transmission line sensor 101, 102 that may be used in a preferred embodiment of the present invention, there is an "energy path discontinuity" caused by a step up or down in the dielectric constant. If a pulsed signal energizes the transmission line sensor 101, 102, as the pulse of energy travels down the transmission line sensor 101, 102 it encounters these boundaries if material has accumulated in the volume 501 immediately surrounding the transmission line sensor 101, 102. At each such boundary, a portion of the pulse's energy is reflected back to the source while the remainder of the pulse's energy continues to propagate through the boundary until another boundary or the abrupt end of the transmission line sensor 101, 102 (e.g., a coaxial cable) causes all or most of the remaining energy to be reflected back along the transmission line sensor 101, 102 toward the signal's source 302, 401, 402.

Measuring the time of round trip propagation of this individual pulse down the entire length of the transmission line sensor 101, 102, and knowing at least the "base" dielectric medium (typically air) through which the pulse is traveling in the volume 501 surrounding the transmission line sensor 101, 102, permits an indication of accumulation of material as manifested by any change in the "base" travel time. Further, by measuring a time for each separate partial reflection of the pulse in the interval over which the pulse is expected to traverse the entire length of the transmission line sensor 101, 102, the physical distance from the reflectometer source 302, 401, 402 to each of the "dielectric boundaries" encountered may be calculated, as well as the "depth" or extent of coverage of the accumulated material between boundaries.

By taking sample measurements of both time of propagation and amplitude of partially reflected signal(s) from a number of different configurations (e.g., types of material or combinations of types of materials, accumulation thickness, temperature, pressure), a file may be built for use in comparing with real time measurements. By storing the sample measurements in a suitable manner, such as a look-up table (not separately shown) in a computer 310, comparisons of real time measurements can be made to the stored information to determine an estimate of not only the type(s) of material and location, but also the magnitude (thickness) 502, 503 of the accumulation.

In one application, a roundtrip travel time for a signal energizing a transmission line sensor 101, 102 on an airframe 200 may be compared to information stored in a look-up table. The comparison will indicate whether an airframe 200 member configured with a preferred embodiment of the present invention is dry, iced, wet with water in its liquid state only, wet with a deicing agent, or combinations thereof; where the accumulation is on the monitored surfaces; and how much is accumulated at each location. A result for any one transmission line sensor 101, 102, 201 may be different from any other depending on the areas of a surface being monitored. This is useful when deciding both where de-icing operations are needed and how much de-icing solution to apply, for example. To design a system for a specific application, certain parameters of the transmission line sensor 101, 102, 201 must be known a priori. One important parameter for a transmission line sensor 101, 102, 201 is its characteristic impedance.

The characteristic impedance, $Z_0$, of a parallel two-line transmission line sensor 101 can be calculated by:

$$Z_0 = \frac{120}{\sqrt{\varepsilon}} \cosh^{-1}\left(\frac{d}{2a}\right) \quad (3)$$

where
a=radius of the conductors
d=center-to-center distance between the parallel conductors For use in detecting ice accretion, a probe such as a transmission line sensor 101, 102 might have a $Z_0$ of 25 ohms ($\Omega$) when immersed in water. The impedance may be changed based on the thickness of material one intends to measure since the effective height of the electromagnetic field in the volume (ellipse) 501 determines the thickness of accumulated material able to be measured. This effective height can be adjusted, within limits, by adjusting the impedance of the transmission line sensor 101, 102, 201 or by changing the frequency of the signal, or a combination thereof. This impedance also changes as the dielectric medium (e.g., water, water/ice mix, ice, water/deicing agent mix) in the volume 501 immediately surrounding the transmission line sensor 101, 102, 201 changes. However, for purposes of a preferred embodiment of the present invention, this change is not problematic unless the impedance of a material accumulating on an instrumented surface closely matches that of the characteristic impedance of the transmission line sensor 101, 102, 201.

EXAMPLE 1

FM-CW Reflectometer Version

Refer to FIGS. 1 and 2. To effect these measurements for a preferred embodiment of the present invention, transmission line sensors 101, 102 consisting of two parallel thin wires 101 or thin strips of conductive tape (not separately shown) are installed longitudinally along the appropriate surfaces 201 of an airframe 200, fixed wing 103 or rotary wing (not separately shown). For a fixed 103 or rotary wing, ice accretion that critically affects the aerodynamics occurs on the leading edge 104. For a fixed wing 103, the transmission line sensor 101, 102 may be fitted longitudinally along the leading edge 104 or fitted as a component of an inflatable deicing boot 202.

Refer to FIG. 3. An FM-CW reflectometer 301 is connected to the end of a transmission line sensor 101, 201. Although not currently available as a commercial off-the-shelf (COTS) system, an FM-CW reflectometer 301 can be implemented using commonly available electronic components as shown in FIG. 3.

These transmission line sensors 101, 102, 201 may be directly connected either to a localized, dedicated reflectometer 301 or via suitable means, such as a coaxial transmission line (not separately shown), to a centralized, shared, reflectometer 301 that multiplexes signals from a number of transmission line sensors 101, 102, 201. An appropriately configured reflectometer 301 can sequentially acquire and process information from a multiplicity of transmission line-based sensors 101, 102, 201 distributed about an airframe 200. Low cost implementations may be used in a distributed format, i.e., one reflectometer 301 dedicated to a single sensor transmission line sensor 101, 102, 201.

In a preferred embodiment of the present invention, a typical implementation of an FM-CW transmission line sensor system's electronics consists of several electronic components. The FM-CW reflectometer 301 feeds the transmission line 101 an RF signal of constant amplitude whose frequency increases linearly with time as controlled by a linear sweep generator 302. (Although most applications use the linear frequency-time relationship, there are applications where a sinusoidal, exponential, logarithmic, or other frequency-time relationship may be useful.) The FM-CW signal is produced by an RF voltage-controlled oscillator (VCO) (not separately shown) with sufficient swept bandwidth (typically 30 to 50% of carrier center frequency) to provide a required resolution. The VCO is driven, for a pre-specified ramp period, by a linear ramp generator (not separately shown), the combination of VCO and ramp generator comprising the linear sweep generator 302. The output of this linear sweep generator 302 is coupled to the transmission line 101 through a circulator 303 (or an equivalent, such as a "T", a "Magic T", or a power splitter) that permits signal flow from the linear sweep generator 302 directly to the transmission line 101. (Although FIG. 3 shows a two-line transmission line sensor 101, the same system can be used for a one line transmission line sensor 102 having an established ground plane, such as the leading edge 202 of a wing 103 that is aluminum.)

The circulator 303 permits one-way transmission of the FM-CW waveform from the linear sweep generator 302 to the transmission line sensor 101 while simultaneously permitting the one-way transmission of any reflected FM-CW signal to be passed on to the processing electronics. While the FM-CW signal passes through the circulator 303 and is directly coupled to the transmission line sensor 101, very little of this transmitted energy is propagated directly to the mixer 304. The small amount of energy that "leaks" as a first "leakage signal" through the circulator 303 to the mixer 304 may be used as a reference, akin to what a signal from a local oscillator provides.

The swept signal propagates down the transmission line 101, reaches the distal end (where it meets a dielectric with a different dielectric constant) and is reflected back to the circulator 303 (and partially reflected from any intermediate boundaries within the volume 501 immediately surrounding the transmission line sensor 101). The reflected signal returning to the circulator 303 is directed to a mixer 304 with very little of this signal's energy being directed back to the linear sweep generator 302. The little energy from the reflected signal that may leak back to the linear sweep generator 302 is of no consequence.

A major part of the original signal returns to the input, typically a circulator 303, having been delayed by the round-trip propagation time, $2t_p$, where $t_p$ is the time required for energy to travel from its source 301, 401, 302 to the distal end of the transmission line 101, 102, 201 in its "normal" medium, typically air, within the volume 501 surrounding the transmission line sensor 101, 102, 201.

The first leakage signal that has propagated across the short path between the linear sweep generator 302 and the mixer 304 during the initial transfer of the signal through the circulator 303 is mixed at the mixer 304, typically a diode incorporating a known minimal delay, with the reflected FM-CW signal to produce the FM-CW output waveform. Once the first leakage signal is mixed with the reflected signal, several products defined by their frequency result. The resulting output of the mixer 304 consists of a high frequency signal, designated for its summed spectra as $\Sigma f$, and a low frequency signal, typically audio, designated for its difference spectra as $\Delta f$.

The product that is used in a preferred embodiment of the present invention is the difference signal, $\Delta f$, i.e., the instantaneous difference in frequency between the first leakage signal and the reflected signal. To eliminate the other product from the mixer 304, i.e., the sum signal, $\Sigma f$, a low pass filter (LPF) 305 is implemented effectively nulling $\Sigma f$.

Within the $\Delta f$ spectrum, one spectral (frequency) component, $F_D$, is proportional to the distance, D, from the signal source to the end of the parallel transmission lines 101, 201. This distance can be determined using spectral analysis techniques. For a parallel lines transmission line sensor 101, 201 surrounded by a "base" homogenous dielectric medium, e.g., air, defined by a refractive index, n, D is derived using:

$$D(m) = \frac{(F_D)(t_{swp})c}{2(BW)(n)} \quad (4)$$

where
$F_D$=difference frequency due to a transmission line impedance discontinuity (dielectric constant change) reflection (Hz)
$t_{swp}$=FM-CW sweep time (s)
c=velocity of light in a vacuum (m/s)
BW=FM-CW swept bandwidth (Hz)

The difference frequency spectra, $\Delta f$, usually occur as audio signals. The spectra can be calibrated as such with known distance, D, related to the round-trip travel time, t, by:

$$t = \frac{(2Dn)}{c} \quad (5)$$

Next, this "passed" signal is filtered through an audio high-pass filter (HPF) 306 to remove DC and low-frequency audio components associated with near-end terminal reflections. An audio amplifier 307 may be used after the HPF 306 to improve signal level for subsequent signal processing. This amplified and filtered signal may be directly processed, analyzed, and stored or displayed in real time.

The difference signal is amplified by the amplifier 307 to an appropriate level and applied to an analog-to-digital converter (ADC) 308 and then to a digital signal processor (DSP) 309. The DSP 309 is used to window, fast Fourier transform (FFT), and compute absolute value. The resulting frequency-domain signal may be displayed in a manner sufficient to indicate the condition of the surface 103. In addition, a second algorithm may be implemented to indicate the extent of accretion, e.g., the amount of ice on an airframe 200 member. This latter information may be used to provide a pilot with an appropriate alert or a ground crew with a quantified measure of ice to be removed.

There are several alternatives for processing the analog audio signal. It can be displayed on an audio-frequency spectrum analyzer (not separately shown) with spectral peaks indicating the boundaries representing a change in dielectric constant. Using a personal computer 310, it can be digitized in an internal analog-to-digital converter (ADC) (not separately shown) and processed by a Fast Fourier Transform (FFT) algorithm, resulting in a plot of power vs. time. The spectral peaks indicate the boundaries representative of a change in dielectric constant.

EXAMPLE 2

Time Domain Reflectometer (TDR)

Figure 4:
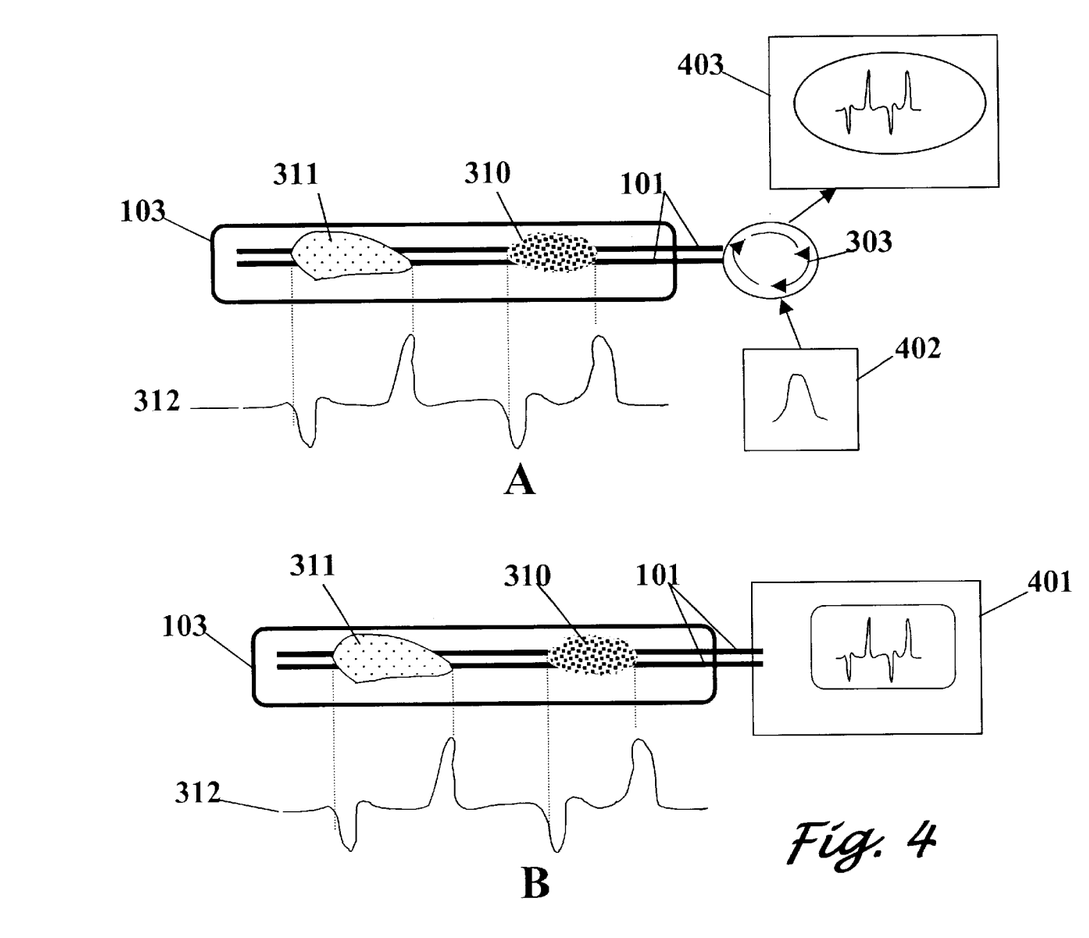
FIG. 4 details a configuration using a pulsed signal source and two examples of related processing electronics associated with a time domain reflectometer for a preferred embodiment of the present invention.

Refer to FIG. 4. In another preferred embodiment, a Time Domain Reflectometer (TDR) 401 is connected directly to a parallel transmission line sensor 101, 201 or a transmission line with associated ground plane 102 that may be affixed to an airframe 200, wing 204 or rotor (not separately shown). The principle of TDR is widely known, described in the technical literature, and applied to numerous measurement and testing applications. An electromagnetic pulse (or a fast rise time step) coupled to a transmission line 101, 102, 201 propagates down the transmission line 101, 102, 201 at a fixed and calculable velocity. The velocity is a function of the speed of light, c, and the electrical and physical characteristics of the transmission line 101, 102, 201. The pulse propagates to the distal end and is reflected back to the input. The time in seconds, t, that it takes the pulse to make the round trip is derived from the relationship:

$$t = \frac{2L}{v} \quad (6)$$

where:
L=length of the parallel metal line sensor (m)
v=velocity of propagation (m/s)

The propagation velocity is determined from the relationship:

$$v = \frac{c}{\varepsilon^{1/2}} = \frac{c}{n} \quad (7)$$

where:
c=velocity of light in free space ($3 \times 10^8$ m/s)
$\in$=the relative dielectric constant of the media in the volume immediately surrounding the transmission line
n=the index of refraction of the media A discontinuity in the medium (dielectric) of the volume 501 adjacent the transmission line sensor 101, 102, 201 (e.g., air/water or water/ice), is defined with conditions associated with the boundary between two different media. This is quantifiable as a sudden change in the dielectric constant, $\in$, from that of the first medium through which the pulse is propagating. As a pulse traveling down the transmission line sensor 101, 102, 201 from the TDR 401 encounters these boundaries, a portion of pulse energy is reflected back to the TDR 401 from the boundary; the rest of the energy continues to propagate through the boundary until another boundary or the end of the transmission line sensor 101, 102, 201 causes all or part of the remaining energy to return along the transmission line sensor 101, 102, 201 towards the TDR 401. Knowing the "base" dielectric medium through which the pulse is traveling and measuring the time of propagation of a round trip of a pulse, or portion thereof, and using spectral analysis, permits calculation of the physical distance from the TDR 401 (source) to each of the boundaries encountered, and may provide a measure of both the type and amount of accumulation when compared against reference data stored in a look-up table, for example. Thus, a wing 103 could be determined to be dry, wet, iced in specific locations to a certain thickness range, be wetted with deicing agent, and combinations thereof.

To effect these measurements, a transmission line sensor 101, 102, 201, consisting of two parallel thin wires or thin strips of conductive tape (not separately shown) or a single thin wire over an associated ground plane is installed along a surface 103 of interest, for example, along the leading edge 104 of a wing 103 of an airframe 200. For a fixed wing 103, the transmission line sensor 101, 102 may be fitted longitudinally along the leading edge 104 or fitted as a component of the inflatable deicing boot 202. These transmission line sensors 101, 102 may be connected directly to a localized, dedicated reflectometer 401 or, via coaxial transmission line (not separately shown), to a centralized, shared, multiplexed reflectometer 401 that can sequentially acquire and process information from a multiplicity of transmission line sensors 101, 102, 201 distributed about an air frame 200. Low cost TDRs 401 may be used in a distributed format; one dedicated to each sensor transmission line sensor 101, 102, 201.

The TDR 401 may be connected to the end of the transmission line sensor 101 through an integral circulator (not separately shown) similar to that circulator 303 used for the FM-CW implementation above. The TDR 401 may be a commercial off-the-shelf (COTS) unit or be implemented using a narrow pulse generator 402, a circulator 303 (or equivalent, such as a "Tee") and an oscilloscope 403 (or equivalent data acquisition device). The circulator 303 permits one-way transmission of a narrow pulse from the pulse generator 402 to the transmission line sensor 101, 102, 201 while permitting simultaneous one-way transmission of the reflected signal to pass to the oscilloscope 403. That is, the narrow pulse goes through the circulator 303 and is directly coupled to the transmission line sensor 101, 102, 201 while very little of the transmitted energy "leaks" directly to the oscilloscope 403. In turn, the reflected signal entering the circulator 303 is directed to the oscilloscope 403 with very little of its energy "leaking" to the narrow pulse source 402 (or COTS TDR 401). This permits an optimum dynamic range of pulse amplitude for display on the oscilloscope 403. If a "Tee" (not separately shown) were used instead of the circulator 303, both the transmitted and reflected portion would be displayed on the oscilloscope 403, with the transmitted portion most probably several orders of magnitude greater than the reflected portion. This makes it inconvenient to set the gain of the oscilloscope to display both the transmitted and reflected pulses at a usable level. By processing this data using an appropriate algorithm, an indication of accumulation of material on a surface may be provided. For example, an alert as to the existence of ice on an airframe may be provided to a pilot or ground crew member.

The above descriptions should not be construed as limiting the scope of the invention but as mere illustrations of preferred embodiments. For example, although examples discussed at length the use of the method and apparatus for detecting accumulation of ice on an aircraft, it is applicable to any situation in which a user may need to detect accumulation of material on a surface, such as manufacturing processes, facility maintenance, snow removal, buildup of ice dams on pitched roofs, etc. The scope shall be determined by appended claims as interpreted in light of the above specification.

We claim:

1. A method for detecting accumulation of material on multiple areas of a surface concurrently, comprising:

disposing on said surface at least one transmission line having a characteristic impedance, a source end, and a distal end having an impedance different from said characteristic impedance, wherein said at least one transmission line is electromagnetically isolated from said surface;

providing at least one electromagnetically conducting ground plane adjacent said at least one transmission line;

providing at least one pulsed signal at a peak signal level of between 0.05 V and 10 V, a carrier frequency of between 1 MHz and 40 GHz, a pulse width of between 0.1 nanosec and 10 millisec, and at a pulse repetition frequency (PRF) of between 0.01 Hz and 1 MHz at said source end, wherein portions of said pulsed signal are distinguishable over at least pre-specified time intervals;

receiving at said source end at least one reflection of said at least one pulsed signal from at least said distal end; and extracting at least one quantifiable feature from said at least one reflection;

wherein at least one value associated with said at least one quantifiable feature may be compared to at least one reference value to at least detect at least one material present in at least a pre-specified amount on said surface.

2. A method for detecting accumulation of material on multiple areas of a surface concurrently, comprising:

disposing on said surface at least one transmission line having a characteristic impedance, a source end, and a distal end having an impedance different from said characteristic impedance, wherein said at least one transmission line is electromagnetically isolated from said surface;

providing at least one electromagnetically conducting ground plane adjacent said at least one transmission line;

providing at least one FM-CW signal at a power level between 1 mW and 10 W, at a carrier center frequency of between 1 MHz and 40 GHz, at a bandwidth of between 10 and 60% of carrier center frequency, said FM-CW signal swept linearly in carrier frequency at a pre-specified period of between 100 millisec to 10 millisec, wherein portions of said FM-CW signal are distinguishable over at least pre-specified time intervals;

receiving at said source end at least one reflection of said at least one FM-CW signal from at least said distal end; and extracting at least one quantifiable feature from said at least one reflection;

wherein at least one value associated with said at least one quantifiable feature may be compared to at least one reference value to at least detect at least one material present in at least a pre-specified amount on said surface.

* * * * *